(12) United States Patent
Urano et al.

(10) Patent No.: US 9,741,994 B2
(45) Date of Patent: Aug. 22, 2017

(54) SECONDARY BATTERY WITH CURRENT BREAKING MECHANISM

(71) Applicant: Hitachi Automotive Systems, Ltd., Hitachinaka-shi, Ibaraki (JP)

(72) Inventors: Kazuaki Urano, Hitachinaka (JP); Masaaki Iwasa, Hitachinaka (JP); Takuro Tsunaki, Hitachinaka (JP); Sho Matsumoto, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 158 days.

(21) Appl. No.: 14/420,836

(22) PCT Filed: Sep. 28, 2012

(86) PCT No.: PCT/JP2012/075161
§ 371 (c)(1),
(2) Date: Feb. 10, 2015

(87) PCT Pub. No.: WO2014/049848
PCT Pub. Date: Apr. 3, 2014

(65) Prior Publication Data
US 2015/0243961 A1  Aug. 27, 2015

(51) Int. Cl.
*H01M 2/34* (2006.01)
*H01M 2/06* (2006.01)
(Continued)

(52) U.S. Cl.
CPC ........... *H01M 2/345* (2013.01); *H01M 2/024* (2013.01); *H01M 2/043* (2013.01); *H01M 2/06* (2013.01);
(Continued)

(58) Field of Classification Search
CPC .................................................... H01M 2/345
See application file for complete search history.

(56) References Cited

U.S. PATENT DOCUMENTS

| | | | |
|---|---|---|---|
| 5,985,478 A | 11/1999 | Kim | |
| 6,210,824 B1 * | 4/2001 | Sullivan | H01M 2/1241 429/53 |

(Continued)

FOREIGN PATENT DOCUMENTS

| | | |
|---|---|---|
| JP | 09-180698 A | 7/1997 |
| JP | 11-031491 A | 2/1999 |

(Continued)

*Primary Examiner* — Imran Akram
(74) *Attorney, Agent, or Firm* — Volpe and Koenig, P.C.

(57) ABSTRACT

A rectangular secondary battery includes a current breaking mechanism with improved rigidity against vibration and impact. The current breaking mechanism is interposed in the middle of a current path electrically connected between an external terminal and a wound electrode group to break the current path by the rise of battery internal pressure. The current breaking mechanism includes a connection electrode arranged inside a battery lid and electrically connected to the external terminal, and a conductive plate bonded to the connection electrode and deformed by the rise of the battery internal pressure. The connection electrode includes a tabular member having a through hole in communication with the outside of the battery opening on a planar portion. The conductive plate includes a dome-shaped diaphragm portion gradually reducing its diameter as shifting in an axial direction and a flange portion extending radially outward from an outer peripheral portion of the diaphragm portion.

14 Claims, 10 Drawing Sheets

(51) Int. Cl.
    *H01M 2/02*     (2006.01)
    *H01M 2/30*     (2006.01)
    *H01M 2/04*     (2006.01)

(52) U.S. Cl.
    CPC .......... *H01M 2/305* (2013.01); *H01M 2/0486* (2013.01); *H01M 2200/20* (2013.01); *H01M 2220/20* (2013.01)

(56) References Cited

U.S. PATENT DOCUMENTS

| | | |
|---|---|---|
| 2008/0038628 A1 | 2/2008 | Yamauchi et al. |
| 2008/0182159 A1* | 7/2008 | Mitani ................ H01M 2/0413 429/56 |
| 2010/0167107 A1 | 7/2010 | Byun |
| 2010/0167116 A1 | 7/2010 | Okada |
| 2010/0233529 A1 | 9/2010 | Nansaka |
| 2013/0095352 A1 | 4/2013 | Yamauchi et al. |
| 2013/0189552 A1 | 7/2013 | Okada |

FOREIGN PATENT DOCUMENTS

| | | |
|---|---|---|
| JP | 11-120979 A | 4/1999 |
| JP | H11-329405 A | 11/1999 |
| JP | 2008-066255 A | 3/2008 |
| JP | 2010-157451 A | 7/2010 |
| JP | 2012-119183 A | 6/2012 |

\* cited by examiner

SECONDARY BATTERY WITH CURRENT BREAKING MECHANISM

TECHNICAL FIELD

The present invention relates to a rectangular secondary battery for in-vehicle use and the like.

BACKGROUND ART

Conventionally, a sealed lithium ion secondary battery to be mounted on a vehicle or other equipment may contain gas in it due to overcharge, excessive temperature rise, breakage by an external force, or the like, the gas leading to a higher pressure inside the battery. Therefore, a weakened location for safety is formed in a battery case of such a sealed battery.

For example, it has been proposed that a member deformable by an internal pressure of the battery is used in a part of the battery case, deformation of which member breaks the weakened part to break a current path or makes communication between inside and outside of the sealed battery to discharge the gas.

For example, Patent Literature 1 discloses a technology of including a sealing body lead and a diaphragm between an external terminal and an internal collector tab and sealing a periphery of the diaphragm in the cylindrical sealing body lead extending orthogonally to a battery lid, in which, as the battery internal pressure rises, the diaphragm deforms to rupture the weakened location, thereby breaking the path of the current.

CITATION LIST

Patent Literature

Patent Literature 1: Japanese Unexamined Patent Application Publication No. 2008-66255

SUMMARY OF INVENTION

Technical Problem

However, with the aforementioned conventional technology, for example, when trying to seal the periphery of the diaphragm in the cylindrical sealing body extending orthogonally to the battery lid, the shape of the thickness portion of the sealing body lead to which the diaphragm is welted or a further processed portion can be more complicated, the welding becomes unstable due to the difficulty in producing flatness, further deforming the diaphragm in a limited space, and making it difficult to obtain enough stress to, rupture the weakened portion, and thus the weakened portion may have to be made still weaker. Thus, there is a problem of losing sealability in a site of a current breaking mechanism or a malfunction is caused when a vibration or an impact is applied to the battery.

It is an object of the present invention to provide a rectangular secondary battery capable of reliably and stably break the current path when the internal pressure rises by stabilizing the weldability with the diaphragm and making the diaphragm further deformable, against the aforementioned problem.

Solution to Problem

To solve the above problem, the present invention employs, for example, the configuration set forth in the claims. The present invention includes a plurality of means for solving the above problems, an example of which is a rectangular secondary battery including a flat electrode group, a battery can housing the electrode group, a battery lid closing an opening of the battery can, an external terminal provided to the battery lid, and a current breaking mechanism interposed in the middle of a current path electrically connecting between the external terminal and the electrode group and breaking the current path by a rise of battery internal pressure, wherein the current breaking mechanism includes a connection electrode arranged inside the battery lid and electrically connected to the external terminal and a conductive plate bonded to the connection electrode and deformed by the rise of the battery internal pressure, the connection electrode includes a tabular member having a through hole in communication with the outside of the battery opening on its planar portion, and the conductive plate includes a dome-shaped diaphragm portion gradually reducing its diameter as shifting in an axial direction and a flange portion extending radially outward from an outer peripheral portion of the diaphragm portion, the diaphragm portion covering the through hole of the connection electrode, and the flange portion being bonded to the planar portion of the connection electrode.

Advantageous Effects of Invention

According to the rectangular secondary battery of the present invention, it is possible to reliably and stably break the current path between the electrode group and the external terminal when the internal pressure rises without losing the sealability or causing a malfunction in the current breaking mechanism if a vibration or an impact is applied to the battery. Problems, configurations, and effects other than those described above will be apparent from the following description of embodiments.

DESCRIPTION OF EMBODIMENTS

Embodiments of the present invention will be described below with reference to drawings. It is noted that a case of a rectangular lithium ion secondary battery used as a driving source of an electric car or a hybrid car is described as an example of the rectangular secondary battery in the following description.

[First Embodiment]

Figure 1:
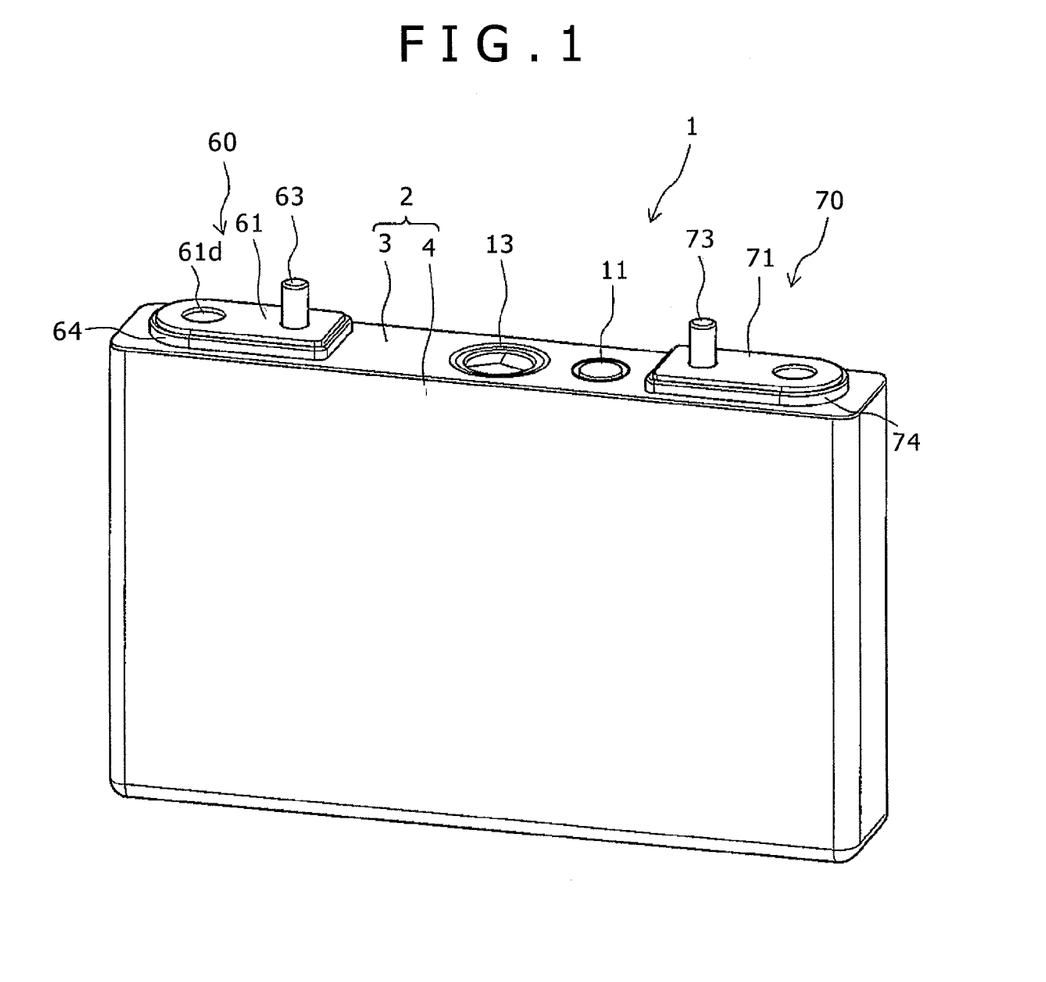
FIG. 1 is an external perspective view of a rectangular secondary battery according to the present embodiment.
Figure 2:
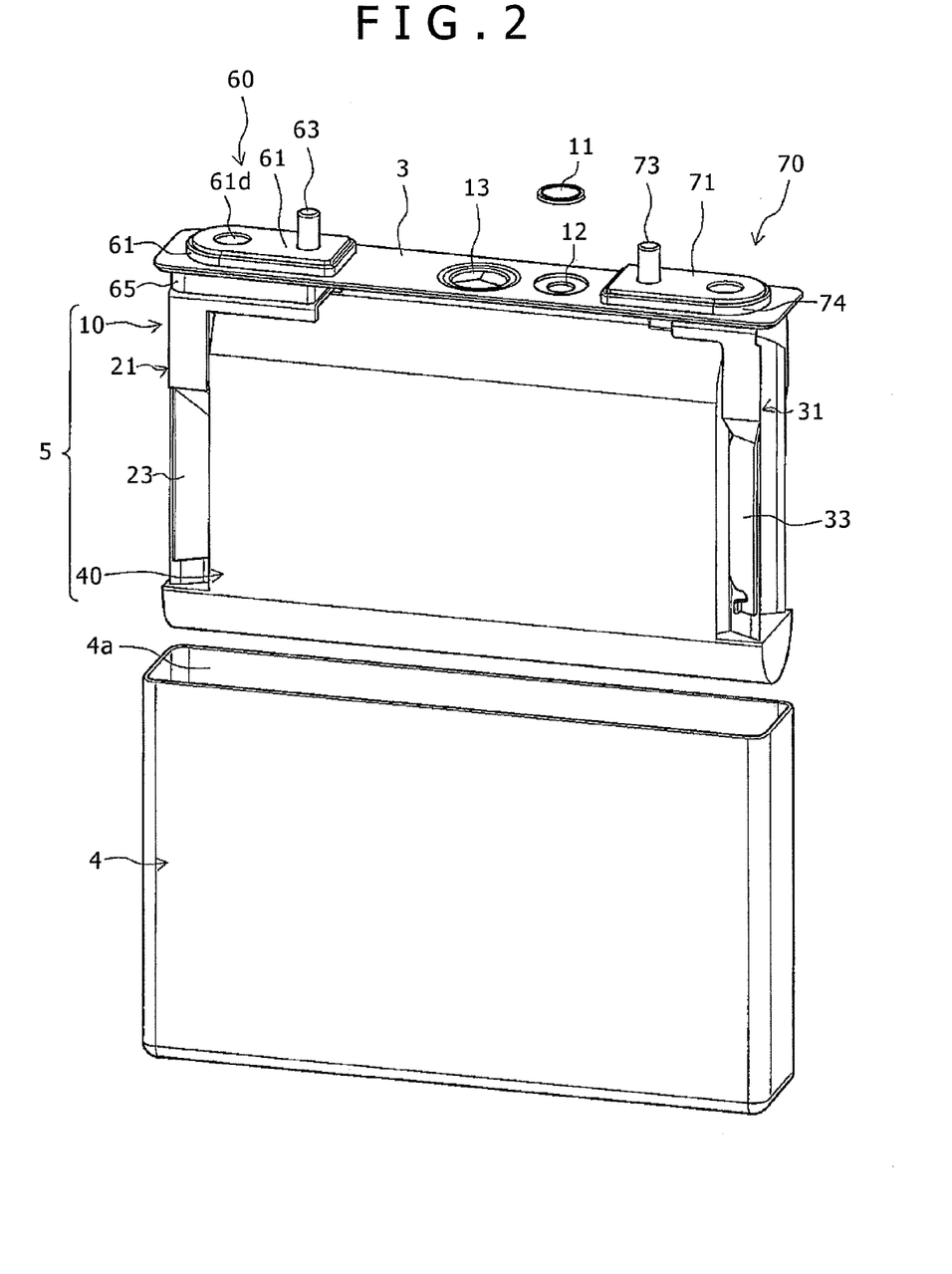
FIG. 2 is an exploded perspective view of the rectangular secondary battery shown in FIG. 1.

FIG. 1 is an external perspective view of the lithium ion secondary battery according to the present embodiment, and FIG. 2 is an exploded perspective view of the lithium ion secondary battery shown in FIG. 1.

A lithium ion secondary battery 1 includes, as shown in FIGS. 1 and 2, a battery case 2 including a battery can 4 having a rectangular deep-drawing shape and a battery lid 3 sealing an opening 4a of the battery can 4. A power generation element is enclosed in the battery case 2. The power generation element includes a wound electrode group 40 wound in a flat shape in a superposed manner with separators 43, 44 interposed between a cathode 41 and an anode 42. The wound electrode group 40 is inserted in the battery can 4 along with a cathode collector plate 21 and an anode collector plate 31 collectively covered by an insulation sheet (not shown).

The battery can 4 and the battery lid 3 are both made of aluminum alloy, and the battery lid 3 is bonded to the battery can 4 by laser welding to seal the opening 4a The battery lid 3 is provided with a positive terminal component 60 and a negative terminal component 70, forming a lid assembly.

The positive terminal component 60 and the negative terminal component 70 include a positive terminal 61 and a negative terminal 71 (a pair of electrode terminals) arranged via first insulators 64, 74, respectively, in between with the battery lid 3. The battery lid 3 is arranged with a gas discharge valve 13 that is opened when the pressure inside the battery case 2 rises higher than a predetermined value and discharges gas in the battery case 2, a liquid inlet 12 for injecting electrolyte into the battery case 2, and a liquid injection plug 11 sealing the liquid inlet 12 after the injection of the electrolyte, in addition to the positive terminal 61 and the negative terminal 71. The liquid injection plug 11 is bonded to the battery lid 3 by the laser welding while closing the liquid inlet 12, thereby sealing the liquid inlet 12.

The positive terminal 61 and the negative terminal 71 are arranged outside the battery lid 3 having a rectangular shape and away from each other on one side and the other side in a longitudinal direction. The positive terminal 61 and the negative terminal 71 hold terminal bolts 63, 73 for fixing a bus-bar connection terminal, and are arranged to the inside of the battery lid 3 in conductive communication. The positive terminal 61 is made of aluminum or aluminum alloy, and the negative terminal 71 is made of copper alloy.

The positive terminal 61 is interposed with a gasket 66 and the first insulator 64 outside the battery lid 3 and also interposed with a second insulator 65 inside the battery lid 3 (see FIG. 4), to be electrically insulated from the battery lid 3. The positive terminal 61 is crimped along with the second insulator 65 and the connection electrode 67 to be fixed to the battery lid 3.

The positive terminal 61 is electrically connected to the cathode collector plate 21 via a current breaking mechanism. The configuration of the current breaking mechanism will be described in detail below. The negative terminal 71 is electrically connected to the anode collector plate 31 via a connection terminal (not shown).

The cathode collector plate 21 and the anode collector plate 31 include a pair of flat junction pieces 23, 33 extending toward the bottom of the battery can 4 and conductively connected to the wound electrode group 40. Each of the junction pieces 23, 33 is bonded to a cathode or an anode provided on either end of the wound electrode group 40 in a direction of the winding axis by welding. Ultrasound welding, resistance welding, laser welding, or the like can be employed as the welding method.

The wound electrode group 40 is arranged between the junction piece 23 of the cathode collector plate 21 and the junction piece 33 of the anode collector plate 31 and supported on both ends, and a power generation element assembly 5 is constituted by the lid assembly and the wound electrode group 40.

Figure 3:
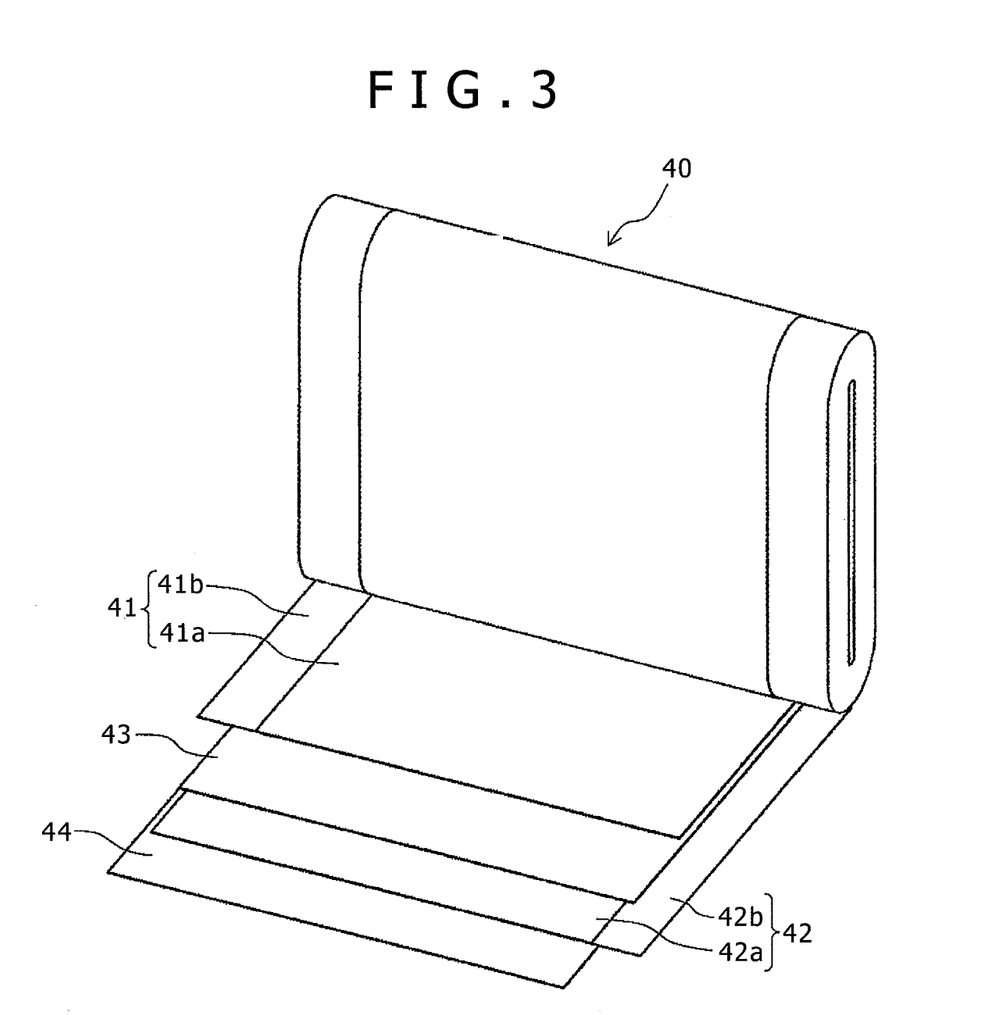
FIG. 3 is an exploded perspective view of a wound electrode group in the rectangular secondary battery shown in FIG. 1.

FIG. 3 is an external perspective view showing details of the wound electrode group 40 shown in FIG. 2 with its winding-finishing end deployed.

The wound electrode group 40 is constituted by arranging the anode 42 and the cathode 41 between the first and second separators 43, 44 and winding them in a flat shape. The wound electrode group 40 has, as shown in FIG. 3, the anode 42 as an outermost electrode, with the separator 44 being further wound around it.

The separators 43, 44 play a role of insulating the cathode 41 and the anode 42. An anode coated portion 42a of the anode 42 is larger than a cathode coated portion 41a of the cathode 41 in a width direction, whereby the cathode coated portion 41a is always configured to be sandwiched by the anode coated portion 42a.

A cathode uncoated portion 41b and an anode uncoated portion 42b are bundled by the planar part and connected by welding or the like to the collector plates 21, 31 on each electrode leading to the positive terminal 61 and the negative terminal 71, respectively. It is noted that, although the separators 43, 44 are wider than the anode coated portion 42a in the width direction, they will not interfere with welding in bundle because they are wound in a position where a metal foil face is exposed on the cathode uncoated portion 41b and the anode uncoated portion 42b.

The cathode 41 includes the cathode coated portion 41a with a cathode active material mixture applied on both faces of a cathode foil serving as a current collector, and is provided with a cathode uncoated portion (foil-exposed portion) 41b not applied with the cathode active material mixture on one end of the cathode foil in the width direction.

The anode 42 includes the anode coated portion 42a applied with an anode active material mixture on both faces of the anode foil serving as the current collector, and is provided with the anode uncoated portion (foil-exposed portion) 42b not applied with the anode active material mixture on the other end of the cathode foil in the width direction. The cathode uncoated portion 41b and the anode uncoated portion 42b are regions where a metallic face is exposed on the electrode foil, and are arranged on one side and the other side in the direction of the winding axis as shown in FIG. 3.

For the anode 42, 10 parts by weight polyvinylidene fluoride (hereinafter, PVDF) serving as a bonding agent is added to 100 parts by weight amorphous carbon powder serving as an anode active material, and N-methylpyrrolidone (hereinafter, NMP) is further added thereto as a dispersion solvent, which is kneaded into an anode mixture. A 10 μm-thick copper foil (anode foil) is coated by the anode mixture on both faces except for a current collector portion (anode uncoated portion). It is then dried, pressed, and cut to obtain an anode of 70 μm thick in the portion applied with the anode, active material excluding the copper foil.

Although the embodiment shows a case of using amorphous carbon as the anode active material, the present invention is not limited thereto but the material can be other carbonaceous material such as natural graphite, various artificial graphite materials, and cokes which can be inserted or desorbed by lithium ion, and its particle shape is not limited and can be scale-like, spherical, fibrous, block-like, and the like.

As for the cathode 41, 10 parts by weight scale-like graphite as the conductive material and 10 parts by weight PVDF as the bonding agent are added to 100 parts by weight lithium manganese oxide (chemical formula: $LiMn_2O_4$) serving as a cathode active material, and NMP is further added thereto as the dispersion solvent, which is kneaded into a cathode mixture. A 20 μm-thick aluminum foil (cathode foil) is coated by the cathode mixture on both faces except for a plain current collector portion (cathode uncoated portion). It is then dried, pressed, and cut to obtain a cathode of 90 μm thick in the portion applied with the cathode active material excluding the aluminum foil.

Although the embodiment shows a case of using lithium manganese oxide as the cathode active material, it is also possible to use other lithium manganese oxides having a spinel crystal structure, lithium-manganese composite oxides partially substituted by or doped with a metal element, lithium cobalt oxides and lithium titanate having a lamellar crystal structure, and lithium composite metal oxides partially substituted by or doped with a metal element.

Although the embodiment shows a case of using PVDF as a bonding material for the coated portion of the cathode and the anode, it is also possible to use a polymer such as polytetrafluoroethylene (PTFE), polyethylene, polystyrene, polybutadiene, isobutylene-isoprene rubber, nitrile rubber, styrene-butadiene rubber, polysulfide rubber, cellulose nitrate, cyanoethyl cellulose, various latex, acrylonitrile, vinyl fluoride, vinylidene fluoride, propylene fluoride, chloroprene fluoride, acrylic resin, and the like, and a mixture thereof.

Nonaqueous electrolyte is poured from the liquid inlet 12 arranged in the battery lid 3. It is also possible to use lithium hexafluorophosphate ($LiPF_6$) dissolved to a concentration of 1 mole/litter in a mixed solution of ethylene carbonate and dimethyl carbonate at a volume ratio of 1:2. The liquid inlet 12 is closed by the liquid injection plug 11 engaged therein after injection of the electrolyte, and it is sealed by laser welding.

Figure 4:
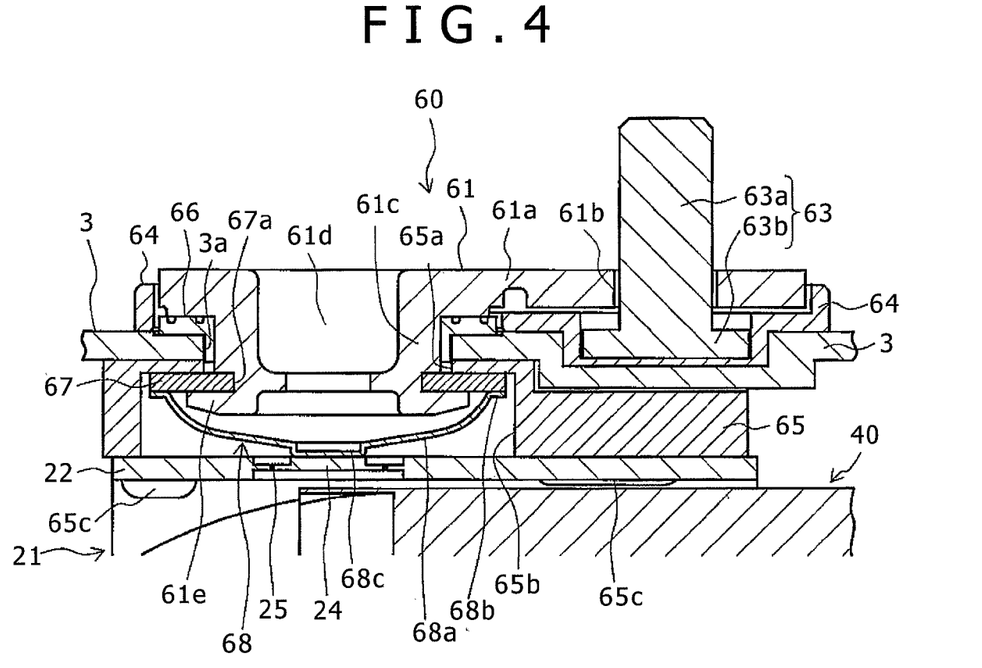
FIG. 4 is a partial cross-sectional view of a current breaking mechanism in a first embodiment.
Figure 5:
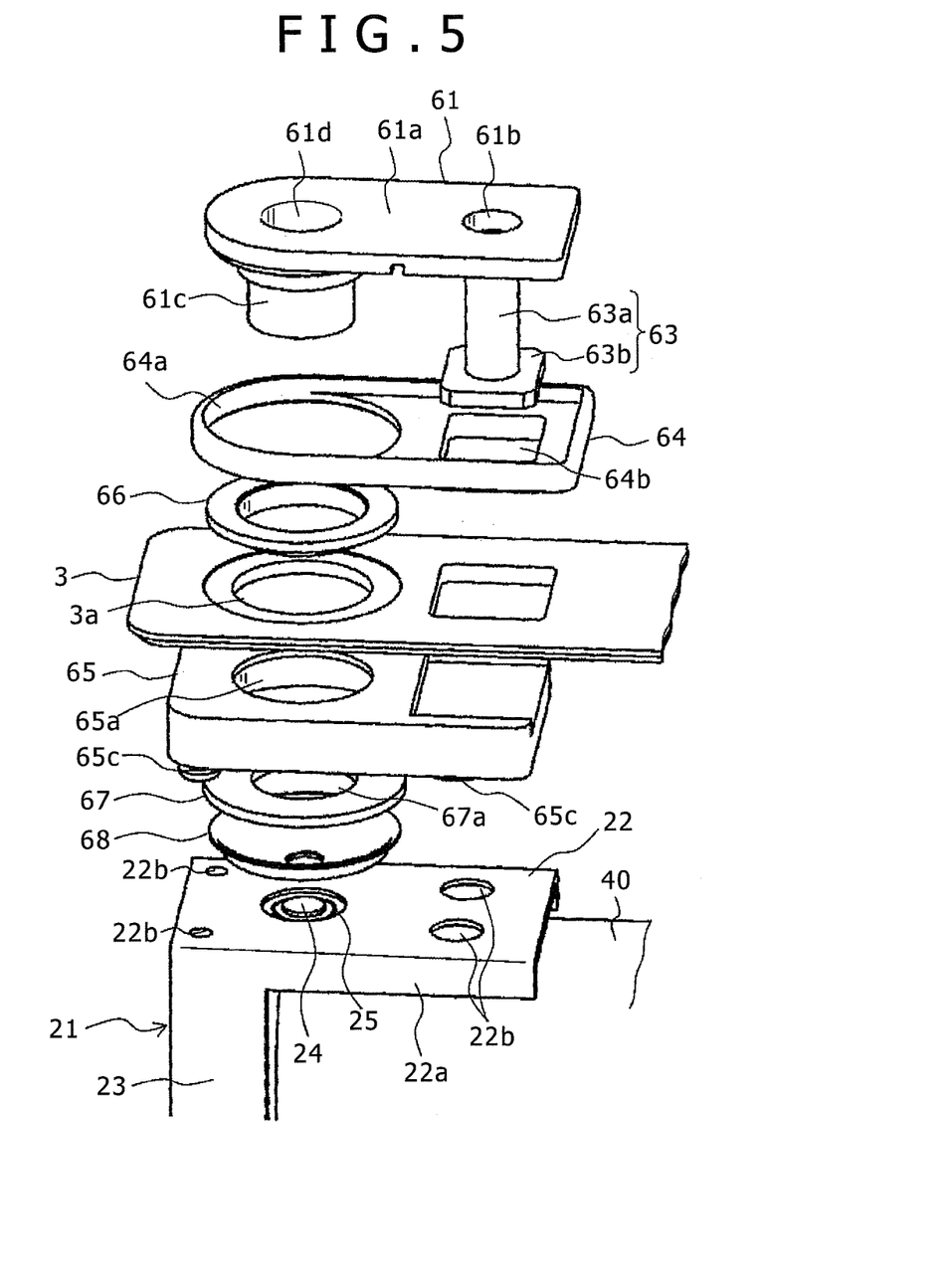
FIG. 5 is a component-exploded perspective view of a configuration shown in FIG. 4.
Figure 6:
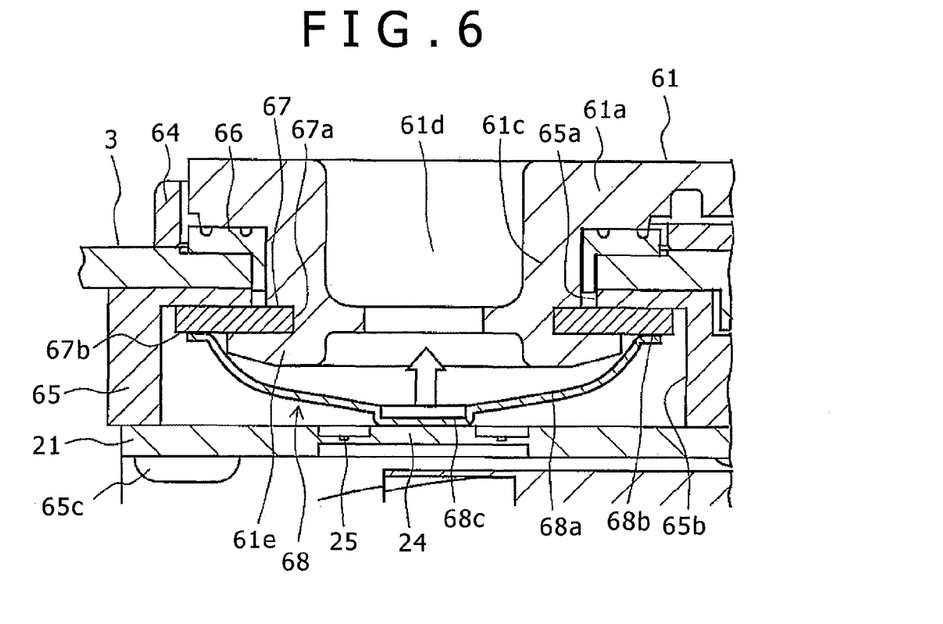
FIG. 6 is a view showing a state before actuation of the current breaking mechanism according to the first embodiment.

FIG. 4 shows a cross-sectional view of the current breaking mechanism, and FIG. 5 shows its component-exploded perspective view.

The current breaking mechanism is provided in the current path from the positive terminal 61 of the positive terminal component 60 to the cathode collector plate 21.

The positive terminal component 60 is constituted by, as shown in FIGS. 4 and 5, the positive terminal 61, the positive terminal bolt 63, the first insulator 64, the second insulator 65, the gasket 66, the cathode connection electrode 67, a conductive plate 68 that deforms by the rise of the battery internal pressure, and the cathode collector plate 21. The positive terminal 61, the first insulator 64, the second insulator 65, the gasket 66, and the cathode connection electrode 67 are crimped integrally by end faces of the positive terminal 61 inside the battery, thereby attached to the battery lid 3. The cathode collector plate 21 is integrally fixed to the second insulator 65.

The positive terminal 61 includes a plate-like main body 61a arranged along an upper face that is an outside of the battery lid 3, a bolt insertion hole 61b penetrating the main body 61a and supporting the positive terminal bolt 63 in an inserting manner, and an axis portion 61c inserted in an opening 3a of the battery lid 3 and protruding inside the battery lid 3, and the axis portion 61c is provided with a through hole 61d axially penetrating the center thereof.

The positive terminal bolt 63 includes an axis portion 63a inserted in the bolt insertion hole 61b of the positive terminal 61, and a head portion (bottom flat portion) 63b interposed between the main body 61a and the first insulator 64 and supported thereby.

The first insulator 64 includes an opening 64a (see FIG. 5) including an insulating plate-like member interposed between the positive terminal 61 and the upper face of the battery lid 3, in communication with the opening 3a of the battery lid 3 for insertion of the axis portion 61c of the positive terminal 61. The gasket 66 is inserted in the opening 3a of the battery lid 3 to insulate and seal between the axis portion 61c of the positive terminal 61 and the battery lid 3.

The cathode connection electrode 67 includes a conductive tabular member arranged inside the battery lid 3, and an opening 67a is provided at the center thereof for communicating with the opening 3a of the battery lid 3 and inserting the axis portion 61c of the positive terminal 61. The cathode connection electrode 67 is arranged along a lower face of the battery lid 3 with the second insulator 65 interposed in between with the battery lid 3, has the opening 67a opening in a planar lower face (planar portion) 67b, and is integrally fixed to the battery lid 3 while being electrically connected to the positive terminal 61 and insulated from the battery lid 3 by extending a tip of the axis portion 61c of the positive terminal 61 protruding from the opening 67a radially outward and crimping it. On the lower face 67b of the cathode connection electrode 67, a crimp portion 61e of the axis portion 61c of the positive terminal 61 protrudes and the through hole 61d in communication with the outside of the battery opens to the inside of the battery.

The second insulator 65 includes an insulating plate-like member arranged along the lower face of the battery lid 3, and is interposed between the battery lid 3 and the cathode connection electrode 67 and between the battery like 3 and the cathode collector plate 21 to insulate between them. The second insulator 65 has a predetermined plate thickness, and is provided with a through hole 65a communicating with the opening 3a of the battery lid 3 for inserting the axis portion 61c of the positive terminal 61. The second insulator 65 is integrally crimped to the battery lid 3 by the crimp portion 61e along with the cathode connection electrode 67.

The second insulator 65 is provided with a concave portion 65b in communication with the through hole 65a and housing the cathode connection electrode 67 and the conductive plate 68. The concave portion 65b is concaved in the lower face of the second insulator 65 and communicates with another space inside the battery.

The conductive plate 68 includes a dome-shaped diaphragm portion 68a gradually reducing its diameter as shifting in an axial direction and a ring-shaped flange portion 68b extending radially outward from an outer peripheral portion of the diaphragm portion 68a. The diaphragm portion 68a faces an open end of the through hole 65a opening in the lower face 67b of the cathode connection electrode 67 to cover it, and the flange portion 68b is bonded to the lower face 67b of the cathode connection electrode 67 for tight sealing, thereby delimiting the space outside the battery and the space inside the battery communicated by the through hole 61d.

Figure 7:
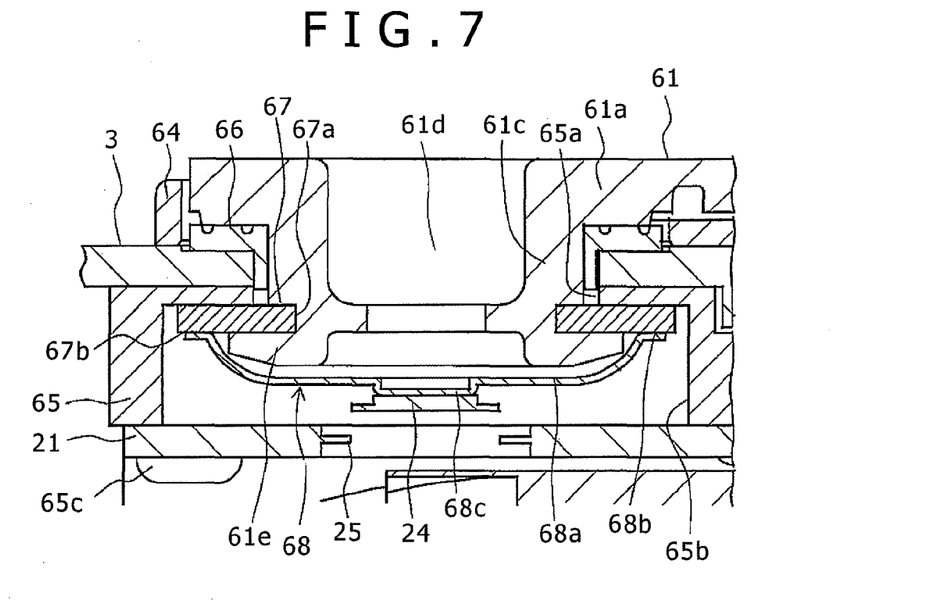
FIG. 7 is a view showing a state after actuation of the current breaking mechanism according to the first embodiment.

When the internal pressure of the battery case 2 increases higher than a preset upper limit, the diaphragm portion 68a is deformed by the pressure difference from the outside of the battery case 2 in a direction of reducing the protruding height to rupture a weakened portion 25 of the cathode collector plate 21 and separate a junction 24 with the conductive plate 68 from a base portion 22, thereby breaking the current path (see, for example, FIG. 7).

The diaphragm portion 68 gradually reduces its diameter as shifting away from the lower face 67b of the cathode connection electrode 67 in an axial direction, and includes a curved surface portion having an arcuate shape with a convex cross section at least partially in the axial direction, i.e., a hemispheric shape with a semi-elliptic cross section in the present embodiment.

The outer peripheral portion of the diaphragm portion 68a is provided with the flange portion 68b for bonding to the lower face 67b of the cathode connection electrode 67. The flange portion 68b has a ring shape extending radially outward on a single plane, continuing with a constant width along the entire periphery, and contacting the lower face of the cathode connection electrode 67. The flange portion is also continuously bonded to the lower face 67b of the cathode connection electrode 67 along the entire periphery by laser welding to be tightly sealed.

The material, the plate thickness, the cross-sectional shape and the like are set so that, when the internal pressure of the battery case 2 increases higher than the preset upper limit, the diaphragm portion 68a is deformed by the pressure difference from the outside of the battery case 2 in a direction of reducing its height to rupture the weakened portion 25 of the cathode collector plate 21 and to hold the junction 24 in a location separated from the cathode collector plate 21 by plastic deformation even after the internal pressure has been reduced. A center portion 68c that is an apex of the diaphragm portion 68c is bonded to the junction 24 of the cathode collector plate 21 by laser welding. Bonding of the center portion 68c may also be performed by resistance welding and ultrasound welding as well as laser welding.

The cathode collector plate 21 is fixedly attached to the second insulator 65. The cathode collector plate 21 includes, as shown in FIG. 5, a tabular base portion (upper face planar portion) extending in parallel facing the lower face of the battery lid 3, and is formed with a plurality of support holes 22b arranged therethrough with a predetermined interval among them. The base portion 22 is provided with a pair of edges 22a formed by folding it away from the battery lid 3 along a pair of longitudinal sides, thereby improving rigidity to keep the planar shape. A pair of junction pieces 23 of the cathode collector plate 21 is provided to continuously protrude on each edge 22a.

The cathode collector plate 21 is bonded to the second insulator 65 and integrally fixed thereto by inserting a plurality of convex portions 65c projecting from the lower face of the second insulator 65 in each support hole 22b of the base portion 22 and thermally welding the tip of the convex portion 65c.

The cathode collector plate 21 is provided with the junction 24 bonded to the center portion 68c of the conductive plate 68. The junction 24 is constituted by a thin portion formed by thinning apart of the base portion 22. The weakened portion 25 is constructed by providing a groove portion in the thin portion so as to surround the periphery of the junction 24, which is broken at the groove portion by the conductive plate 68 that deforms toward the outside of the battery when the battery internal pressure rises, thereby separating the junction 24 from the base portion 22.

The dimension, the shape, and the like of the weakened portion 25 are set to have a strength that allows, along with the deformation of the conductive plate 68 due to the rise of the internal pressure of the battery case 2, a rupture when a force in a direction of pulling toward the battery lid 3 is applied but preventing a rupture under a normal use condition such as a vibration while travelling. Bonding of the center portion 68c of the conductive plate 68 and the junction 24 of the cathode collector plate 21 is performed by laser welding, but resistance welding, ultrasound welding, and the like are also possible.

The current breaking mechanism having the above configuration has its conductive plate 68 deformed in a direction of reducing the protruding height due to the pressure difference from the outside of the battery case 2 when the internal pressure of the battery case 2 increases higher than the preset upper limit. This pulls the junction 24 surrounded by the weakened portion 25 of the cathode collector plate 21 in a direction orthogonal to the base portion 22, ruptures the weakened portion 25 of the cathode collector plate 21, and separates the junction 24 with the conductive plate 68 from the base portion 22 of the cathode collector plate 21, thereby breaking the current path between the positive terminal 61 and the cathode collector plate 21.

A method of manufacturing the positive terminal component 60 having the above configuration is described below.

(1) Crimp

First, the first insulator 64 and the gasket 66 are arranged in alignment with the opening 3a of the battery lid 3 outside the battery of the battery lid 3. The head portion 63b of the positive terminal bolt 63 is then inserted in the concave portion 64b provided in the first insulator 64, the axis portion 61c of the positive terminal 61 is inserted in the opening 64a on the first insulator 64, and at the same time the axis portion 63a of the positive terminal bolt 63 is inserted in the bolt insertion hole 61b of the positive terminal 61.

The battery lid 3 and the cathode connection electrode 67 are superposed with the second insulator 65 interposed between them, and the second insulator 65 and the cathode connection electrode 67 are arranged so that the through hole 65a of the second insulator 65 and the opening 67a of the cathode connection electrode 67 are arranged concentrically.

The positive terminal 61 is drawn closer from the outside of the battery of the battery lid 3 to superpose the main body 61a of the positive terminal 61 on the first insulator 64, and the axis portion 61c of the positive terminal 61 is inserted in the opening 64a of the first insulator 64, the gasket 66, the opening 3a of the battery lid 3, the through hole 65a of the second insulator 65, and the opening 67a of the cathode connection electrode 67 in the order, before crimping the tip of the axis portion 61c.

In the crimping process, an outer diameter of the crimp punch is one size larger than that of the crimp portion 61e. When there is a projection such as a rib or a convex portion on the lower face 67b of the cathode connection electrode 67, it prevents crimping due to interference, and therefore the outer diameter of the crimp punch needs to be made smaller accordingly. By reducing the outer diameter of the crimp portion 61e, a crimped area is reduced, which may reduce the crimp strength.

The cathode connection electrode 67 in the lithium ion secondary battery 1 of the present embodiment is constituted by the tabular member, and its lower face 67b is flat without any projection such as a rib or a convex portion. Thus, the crimp outer diameter can be kept larger accordingly allowing for higher crimp strength, which is advantageous. Moreover, when fixing the cathode connection electrode 67 to the battery lid 3 by crimping the tip of the axis portion 61c of the positive terminal 61, because the cathode connection electrode 67 is tabular, the outer diameter of the crimp punch can be set without being affected by the size of the cathode connection electrode 67.

(2) Bonding Between Cathode Connection Electrode 67 and Conductive Plate 68

The lower face 67b of the cathode connection electrode 67 is contacted by the flange portion 68b of the conductive plate 68, and they are bonded to each other by laser welding to be tightly sealed.

The conductive plate 68 has a dome shape so as to avoid the crimp portion 61e of the positive terminal 61, allowing for a larger surface area of the conductive plate 68 in a smaller space. Thus, when the internal pressure of the battery case 2 rises, the conductive plate 68 can deform easily, enabling a reliable current breaking at a lower pressure.

(3) Bonding Between Cathode Collector Plate 21 and Second Insulator 65, Conductive Plate 68

The cathode collector plate 21 is provided with several support holes 22b in the base portion 22 and a convex portion 65c to be inserted in the support hole 22b in a planar portion inside the battery which is a lower face of the second insulator 65 and facing the support hole 22b. By inserting the convex portion 65c in the support hole 22b and thermally welding the tip of the convex portion 65c, the cathode collector plate 21 is bonded to the second insulator 65.

Because the cathode collector plate 21 is bonded by thermal welding to the battery lid 3 and the second insulator 65 rigidly fixed by crimping, an adverse effect on the weakened portion 25 of the base portion 22 and the junction 24 can be minimized against the external vibration or impact applied to the cathode collector plate 21.

Although a case of thermal welding is taken as an example of fixing of the cathode collector plate 21 and the second insulator 65 because of the simple processing step, when a stronger bonding is required, it is also possible to use at least one of a screw, a rivet, and an adhesive instead of thermal welding or in addition to thermal welding.

The junction 24 of the cathode collector plate 21 is bonded to the center portion 68c of the conductive plate 68. The junction 24 of the cathode collector plate 21 is bonded to the center portion 68c of the conductive plate 68 by welding. The bonding of the center portion 68c of the conductive plate 68 and the junction 24 of the cathode collector plate 21 can be performed by resistance welding, ultrasound welding, and the like, as well as laser welding. The positive terminal component 60 is manufactured through the steps of (1), (2), and (3) described above.

In the positive terminal component 60, the cathode collector plate 21, the conductive plate 68, the cathode connection electrode 67, the positive terminal 61, and the positive terminal bolt 63 are electrically connected to one another but insulated from the battery lid 3 by the first insulator 64, the gasket 66, and the second insulator 65.

In this embodiment, the cathode collector plate 21, the conductive plate 68, and the cathode connection electrode 67 are formed of aluminum or aluminum alloy. When the lithium ion secondary battery 1 is constituted by aluminum alloy on the cathode side and copper alloy on the anode side, the aluminum alloy can be more easily deformed and more easily ruptured than the copper alloy. Thus, in this embodiment, the current breaking mechanism is provided on the cathode side.

To assemble the lithium ion secondary battery 1, after assembling the lid assembly including the positive terminal component 60 manufactured in the above method, the wound electrode group 40 is bonded to the cathode collector plate 21 and the anode collector plate 31, thereby assembling the power generation element assembly 5.

The periphery of the wound electrode group 40 is covered by the insulation sheet (not shown) with respect to each cathode collector plate 21 and anode collector plate 31 to be inserted in the battery can 4, the opening 4a of the battery can 4 is closed by the battery lid 3, and the battery lid 3 is bonded to the battery can 4 by laser welding to be sealed. An electrolyte is injected in the battery case 2 through the liquid inlet 12, and then the liquid inlet 12 is closed by the liquid injection plug 11 and bonded to the battery lid 3 by laser welding to be sealed. The lithium ion secondary battery 1 assembled according to the assembling operation described above is capable of charging and discharging with respect to an external electronic equipment connected by the positive terminal 61 and the positive terminal bolt 63, and the negative terminal 71 and the negative terminal bolt 73.

The lithium ion secondary battery 1 in this embodiment can present the following effects.

Although the current breaking mechanism can keep high safety by rupturing the weakened portion of the current breaking mechanism in unforeseen circumstances such as an overcharge by being interposed in the current path between the wound electrode group 40 and the positive terminal 61 (external terminal), it can impair the sealability due to, for example, rupture by the external vibration or impact in the weakened portion or the welded portion, causing a malfunction or quality degradation.

To the contrary, the lithium ion secondary battery 1 according to the embodiment includes the cathode connection electrode 67 including the tabular member and the conductive plate 68 having the diaphragm portion 68, and is configured to tightly seal between the cathode connection electrode 67 and the conductive plate 68 by being welded with the flange portion 68b of the conductive plate 68 in contact with the lower face 67b of the cathode connection electrode 67.

Thus, it is possible to simplify the part shape of the cathode connection electrode 67 and the conductive plate 68 that are sealing parts and to stabilize the weldability to the conductive plate 68 using the flatness of the lower face 67b of the cathode connection electrode 67, compared with the conventional ones.

Moreover, because the diaphragm portion 68a of the conductive plate 68 has the dome shape, it is possible to receive pressure with a larger area by the battery internal pressure rise, and to more easily obtain sufficient stress to rupture the weakened portion 25 by deforming the conductive plate 68 in the limited space, compared with the tabular one. Accordingly, it is possible to make the rigidity of the weakened portion 25 relatively higher with the same rupturing pressure being set, to prevent the weakened portion 25 from being ruptured by the vibration and the impact, and to break the current path reliably and stably when the internal pressure rises.

Furthermore, because the lithium ion secondary battery 1 is configured to fix the cathode collector plate 21 to the second insulator 65, it can suppress an application of the vibration or the impact to the junction 24 and the weakened portion 25. Specifically because the cathode collector plate 21 is bonded to the second insulator 65 by thermal welding or the like which is solidly crimped to the battery lid 3, it is possible to prevent the external vibration and impact applied to the cathode collector plate 21 from being transferred to the junction 24 and the weakened portion 25 to prevent occurrence of detachment of the junction 24 or a rupture of the weakened portion 25 in an unintended situation. Accordingly, it is possible to obtain the lithium ion secondary battery 1 including a current breaking mechanism with improved rigidity against the vibration and the impact.

Although the embodiment describes a case of providing the current breaking mechanism to the positive terminal component 60, it is also possible to similarly provide the current breaking mechanism to the negative terminal component 70.

[Second Embodiment]

A second embodiment will be described below with reference to FIG. 8.

Figure 8:
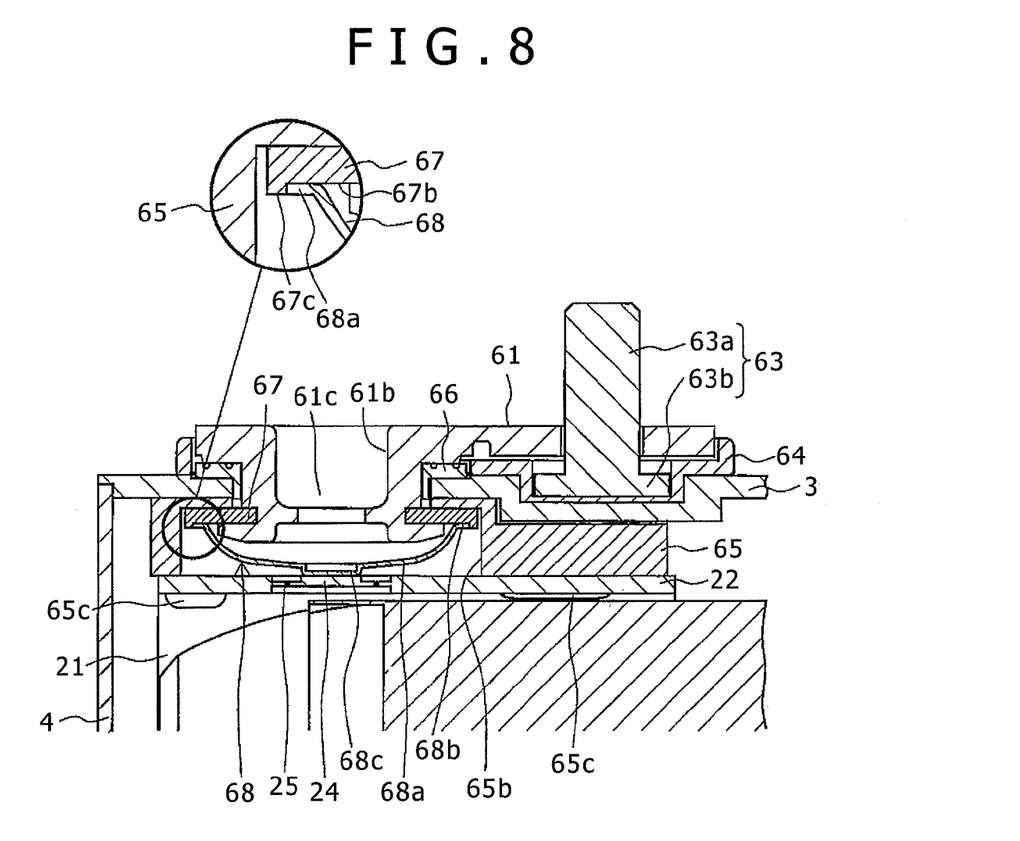
FIG. 8 is a partial cross-sectional view of the current breaking mechanism according to a second embodiment.

FIG. 8 shows a partial cross-sectional view of a current breaking mechanism according to the second embodiment. It is noted that a component similar to that in the first embodiment described above is denoted by the same reference numeral, thereby omitting detailed explanation thereof.

The feature of the present embodiment is that an outer periphery of the lower face 67*b* for bonding the conductive plate 68 of the cathode connection electrode 67 is provided with a circumferential rib 67*c* into which the flange portion 68*b* of the conductive plate 68 is impacted and fixed.

The rib 67*c* is provided to a radially outer position with respect to the flange portion 68*b* of the conductive plate 68 facing an outer face of the flange portion 68*b* along the entire periphery. It also has a height to be flush with the flange portion 68*b*. A boundary between the outer end face of the flange portion 68*b* and a facing surface of the rib 67*c* facing it is bonded by laser welding, thereby tightly sealing between the cathode connection electrode 67 and the conductive plate 68.

According to the above configuration, when performing laser welding the conductive plate 68 is impacted and fixed by the rib 67*c*, the positioning of which is facilitated, and the welding energy is also kept lower by eliminating a step at a welding portion between the flange portion 68*b* of the conductive plate 68 and the cathode connection electrode 67, whereby the welding quality becomes more stable when laser welding the boundary between the cathode connection electrode 67 and the conductive plate 68.

[Third Embodiment]

A third embodiment will be described below with reference to FIG. 9.

Figure 9:
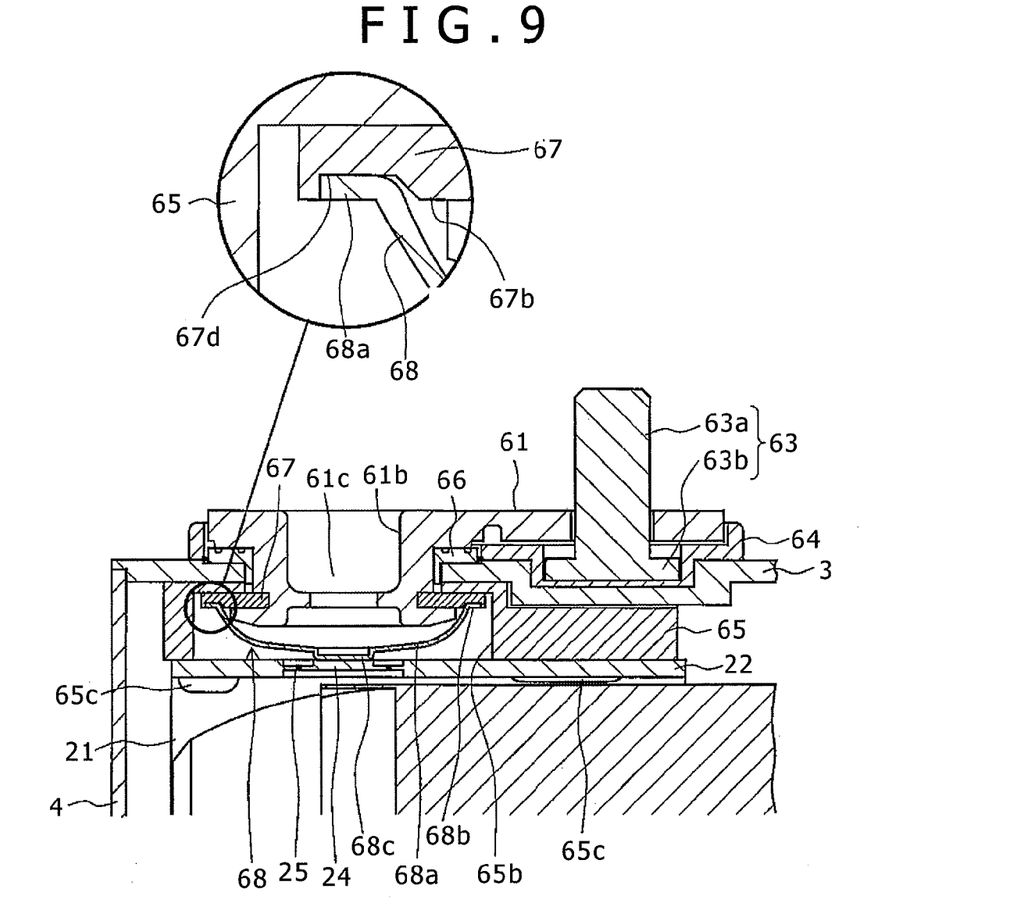
FIG. 9 is a partial cross-sectional view of the current breaking mechanism according to a third embodiment.

FIG. 9 shows a partial cross-sectional view of a current breaking mechanism according to the third embodiment. It is noted that a component similar to that in each embodiment described above is denoted by the same reference numeral, thereby omitting detailed explanation thereof.

The feature of the present embodiment is that the lower face 67*b* for bonding the conductive plate 68 of the cathode connection electrode 67 is provided with an annular concave groove 67*d* into which the flange portion 68*b* of the conductive plate 68 is impacted and fixed.

The concave groove 67*d* has a groove shape such that the outer end face of the flange portion 68*b* faces an outer circumferential vertical wall of the concave groove 67*d* by impacting the flange portion 68*b* and that the flange portion 68*b* has a height flush with the lower face 67*b*. The boundary between the outer circumferential vertical wall of the concave groove 67*d* and the outer end face of the flange portion 68*b* facing it is bonded by laser welding, thereby tightly sealing between the cathode connection electrode 67 and the conductive plate 68.

According to the above configuration, as in the second embodiment, when performing laser welding the flange portion 68*b* is impacted and fixed into the concave groove 67*d* facilitating the positioning of the conductive plate 68, and the welding energy is also kept lower by eliminating the step at the welding portion between the flange portion 68*b* of the conductive plate 68 and the cathode connection electrode 67, whereby the welding quality becomes more stable when laser welding the boundary between the cathode connection electrode 67 and the conductive plate 68. Moreover, as in the first embodiment, because there is no projection such as a rib or a convex portion on the lower face 67*b* of the cathode connection electrode 67, the outer diameter of the crimp punch for crimping can be set larger. Therefore, the crimp strength can be higher.

[Fourth Embodiment]

A fourth embodiment will be described below with reference to FIG. 10.

Figure 10:
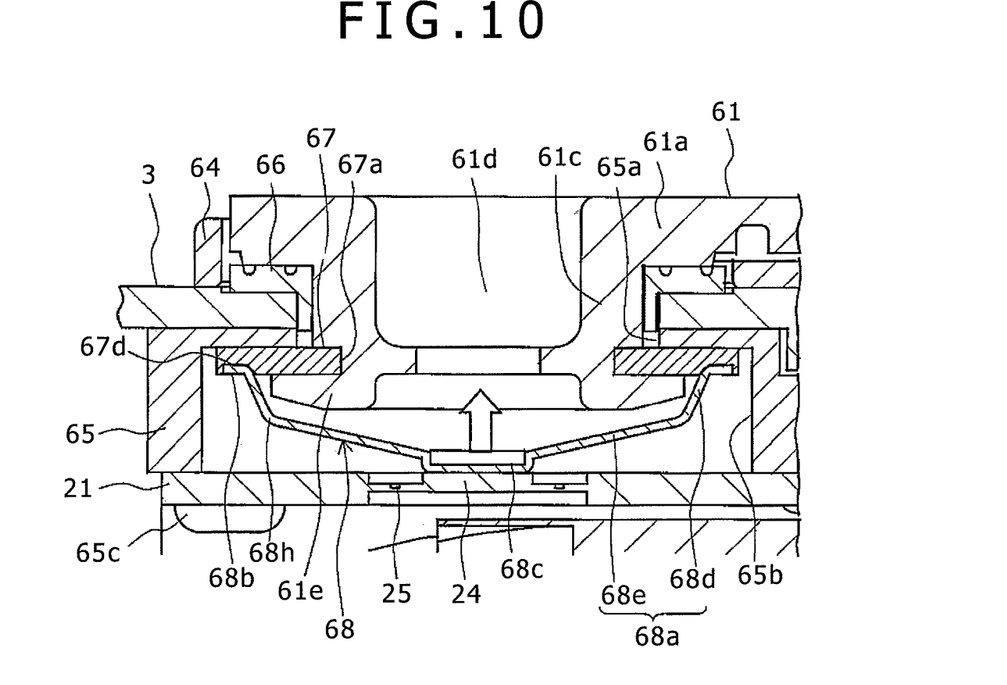
FIG. 10 is a partial cross-sectional view of the current breaking mechanism according to a fourth embodiment.

FIG. 10 shows a partial cross-sectional view of a current breaking mechanism according to the fourth embodiment. It is noted that a component similar to that in each embodiment described above is denoted by the same reference numeral, thereby omitting detailed explanation thereof.

The feature of the present embodiment is that the dome-shaped diaphragm portion 68*a* of the conductive plate 68 has a three-dimensional shape with its diameter gradually reduced as shifting away from the cathode connection electrode 67 in the axial direction and combining a smooth surface portion having a straight cross section and a curved surface portion having an arcuate cross section arranged in the axial direction.

In the first to third embodiments described above, an explanation is given taking an example in which the diaphragm portion 68*a* has a hemispheric shape with a semi-elliptic cross section.

The diaphragm portion 68*a* of the conductive plate 68 according to the embodiment has the three-dimensional shape with its diameter gradually reduced as shifting away from the lower face 67*b* of the cathode connection electrode 67 in the axial direction and combining the smooth surface portion having the straight cross section and the curved surface portion having the convex arcuate cross section arranged in the axial direction.

This embodiment has a smooth surface portion 68*d* continuing to the flange portion 68*b* on a side closer to the cathode connection electrode 67 and a curved surface portion 68*e* before breaking away from the cathode connection electrode 67. There is also provided a bending portion 68*h* bending in the shape of the arcuate cross section (boundary of partially combined curved and smooth surfaces) in a boundary portion between the smooth surface portion and the curved surface portion.

According to the above configuration, when the convex height of the crimp portion 61*e* of the positive terminal 61 is large, by partially providing the smooth surface portion 68*d* toward the center from a position in the conductive plate 68 bonding to the cathode connection electrode 67 and providing the curved surface portion 68*e* toward the center from the bending portion 68*h*, a clearance from the crimp portion 61*e* can be made and thereby preventing the diaphragm portion 68*a* from interfering with the crimp portion 61*e*. At the same time, the rise of the battery internal pressure can efficiently deform the diaphragm portion 68*a* toward the outside of the battery, in which direction the height is reduced, enabling a more stable rupture at a low pressure. Moreover, depending on the shape of the convex height of the crimp portion 61*e*, it is possible to the contrary to partially provide the curved surface portion toward the center from the position in the conductive plate 68 bonding to the cathode connection electrode 67 and provide the smooth surface portion toward the center from the bending portion 68*h*.

Although the above embodiment describes the shape of the diaphragm portion 68a of the conductive plate 68 taking an example of combining a single curved surface portion and a single smooth surface portion, the embodiment is not limited thereto but, for example, there can be provided a plurality of either curved surface portions or smooth surface portions, or there can be a combination of a plurality of curved surface portions with different curvatures or a combination of a plurality of smooth surface portions with different inclination angles.

As for the configuration of the cathode connection electrode 67 in the portion bonding to the flange portion 68b of the conductive plate 68 in FIG. 10, although a case of the concave groove (see FIG. 9) 67d shown in the third embodiment is taken as an example, it is also possible alternatively to employ what has the configuration described in the first and second embodiments (flat surface, rib).

[Fifth Embodiment]

A fifth embodiment will be described below with reference to FIG. 11.

Figure 11:
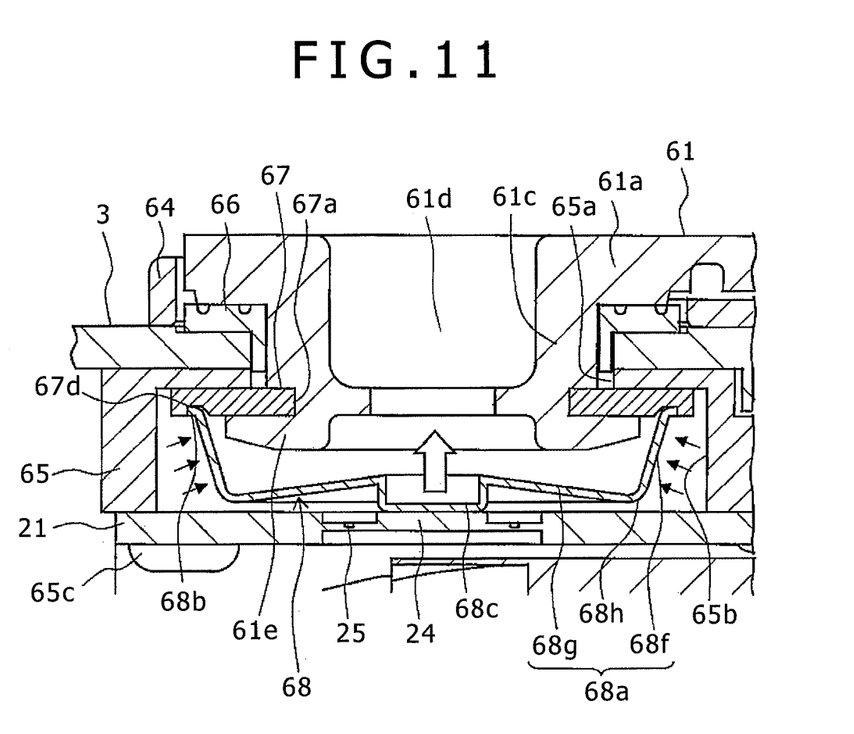
FIG. 11 is a partial cross-sectional view of the current breaking mechanism according to a fifth embodiment.

FIG. 11 shows a partial cross-sectional view of a current breaking mechanism according to the fifth embodiment. It is noted that a component similar to that in each embodiment described above is denoted by the same reference numeral, thereby omitting detailed explanation thereof.

The feature of the present embodiment is that the dome-shaped diaphragm portion 68a of the conductive plate 68 has a three-dimensional shape with a substantially W-shaped cross section combining a first inclined surface portion 68f gradually reducing its diameter as shifting away from the cathode connection electrode 67 in the axial direction and a second inclined surface portion 68g gradually reducing its diameter as shifting from the first inclined surface portion 68f toward the cathode connection electrode 67. There is also provided the bending portion 68h bending in the shape of the arcuate cross section in the boundary portion between the first inclined surface portion 68f and the second inclined surface portion 68g.

The first inclined surface portion 68f and the second inclined surface portion 68g both have a smooth surface shape with a straight cross section, but one or both of them may have a curved surface shape with an arcuate cross section. For example, the first inclined surface portion 68f may have the curved surface shape with the convex (convex toward the inside of the battery) arcuate cross section, and the second inclined surface portion 68g may have the curved surface shape with a concave (convex toward the outside of the battery) arcuate cross section.

According to the above configuration, when the internal pressure rises due to a failure of the battery, the first inclined surface portion 68f receives a force in a direction of being pushed in radially toward the center, and the second inclined surface portion 68g receives a force in a direction of pushing up the center portion 68c toward the outside of the battery (the direction indicated by a thick arrow in the drawing), i.e. the force in the direction of bringing it closer to the cathode connection electrode 67. Thus, it is possible to efficiently deform the conductive plate 68, enabling a more stable rupture at the low pressure.

Moreover, as for the configuration of the cathode connection electrode 67 in the portion bonding to the flange portion 68b of the conductive plate 68 in FIG. 11, although the case of the concave groove (see FIG. 9) 67d shown in the third embodiment is taken up as an example, it is also possible alternatively to employ what has the configuration described in the first and second embodiments (flat surface, rib).

Although the embodiments of the present invention are described above in detail, the present invention is not limited to the above embodiments but may have various modifications without departing from the spirit of the present invention set forth in the appended claims. For example, the embodiments described above are detailed explanations for clear understanding of the present invention and the present invention is not necessarily limited to have all the configurations described. Moreover, it is possible to replace a part of a configuration in one embodiment with a configuration in another embodiment, and also to add a configuration of one embodiment to a configuration of another embodiment. Furthermore, it is also possible to add another configuration to, delete, or replace a part of a configuration in each embodiment.

REFERENCE SIGNS LIST

1: lithium ion secondary battery (rectangular secondary battery)
2: battery case
3: battery lid
4: battery can
21: cathode collector plate.
24: junction
25: weakened portion
31: anode collector plate
40: electrode group
60: positive terminal component
61: positive terminal (external terminal)
61d: through hole
64: first insulator
65: second insulator
66: gasket
67: cathode connection electrode
67b: lower face (planar portion)
67c: rib
67d: concave groove
68: conductive plate
68a: diaphragm portion
68b: flange portion
68c: center portion
68d: smooth surface portion
68e: curved surface portion
68h: bending portion
68f: first inclined surface portion
68g: second inclined surface portion

The invention claimed is:

1. A rectangular secondary battery comprising a flat electrode group, a battery can housing the electrode group, a battery lid closing an opening of the battery can, an external terminal provided to the battery lid, and a current breaking mechanism interposed in the middle of a current path electrically connecting the external terminal and the electrode group and breaking the current path by a rise of battery internal pressure, wherein the current breaking mechanism includes:
a connection electrode arranged inside the battery lid and electrically connected to the external terminal and a conductive plate bonded to the connection electrode and deformed by the rise of the battery internal pressure,
a crimp portion composed of the external terminal crimped around an opening of the connection electrode and fixed to an insulator attached to an underside of the battery lid, wherein the crimp portion protrudes beneath the battery lid and above the conductive plate, the connection electrode includes a planar portion having a through hole in communication with the outside of the battery, and the conductive plate includes a dome-shaped diaphragm portion in a non-deformed state protruding away from the crimp portion, and a ring-shaped flange portion extending radially outward from an outer peripheral portion of the diaphragm portion, the diaphragm portion covering the through hole of the connection electrode, and the flange portion being bonded to the planar portion of the connection electrode.

2. The rectangular secondary battery according to claim 1, wherein the planar portion of the connection electrode is provided with an annular concave groove into which the flange portion is impacted, a boundary between an outer vertical wall of the concave groove and an outer end face of the flange portion being bonded and sealed by welding.

3. The rectangular secondary battery according to claim 1, wherein the planar portion of the connection electrode is provided with a rib facing the outer end face of the flange portion along the entire periphery, the facing surface of the rib and the flange portion being bonded to one another and sealed by welding.

4. The rectangular secondary battery according to claim 1, wherein the diaphragm portion includes a curved surface portion having an arcuate shape with a convex cross section in at least a part thereof in the axial direction.

5. The rectangular secondary battery according to claim 1, wherein the diaphragm portion includes a smooth surface portion having a straight cross section in at least a part thereof in the axial direction.

6. The rectangular secondary battery according to claim 1, wherein the diaphragm portion has a three-dimensional shape combining a curved surface portion with a convex arcuate cross section and a smooth surface portion with a straight cross section arranged in the axial direction.

7. The rectangular secondary battery according to claim 6, wherein the boundary between the curved surface portion and the smooth surface portion is provided with a bending portion bending in the shape of the arcuate cross section.

8. The rectangular secondary battery according to claim 1, wherein the diaphragm portion has a three-dimensional shape combining a plurality of smooth surface portions with a straight cross section and with different inclination angles with respect to the axial direction arranged in the axial direction.

9. The rectangular secondary battery according to claim 8, wherein the boundary portion between the plurality of smooth surface portions is provided with a bending portion bending in the shape of the arcuate cross section.

10. The rectangular secondary battery according to claim 1, wherein the diaphragm portion includes a first inclined surface portion gradually reducing its diameter as shifting away from the connection electrode in the axial direction and a second inclined surface portion gradually reducing its diameter as shifting from the first inclined surface portion toward the connection electrode in the axial direction.

11. The rectangular secondary battery according to claim 10, wherein the boundary between the first inclined surface portion and the second inclined surface portion is provided with a bending portion having a convex arcuate cross section bending.

12. The rectangular secondary battery according to claim 1, comprising a collector plate electrically connected to the electrode group,
wherein the collector plate includes a junction bonded to a center portion of the diaphragm portion of the conductive plate and a weakened portion formed around the junction and ruptured by deformation of the diaphragm portion.

13. The rectangular secondary battery according to claim 12, comprising a second insulator interposed between the battery lid and the connection electrode and integrally crimped to the battery lid along with the connection electrode,
wherein the collector plate is bonded and fixed to the second insulator by at least one of thermal welding, a screw, a rivet, or an adhesive.

14. The rectangular secondary battery according to claim 12, wherein the collector plate, the conductive plate, the connection electrode, and the cathode external terminal connected to the cathode of the electrode group are made of aluminum or aluminum alloy.

\* \* \* \* \*